United States Patent
Vataja et al.

(10) Patent No.: US 7,580,894 B2
(45) Date of Patent: Aug. 25, 2009

(54) METHOD, DEVICE AND COMPUTER PROGRAM PRODUCT FOR ACTIVATING THE RIGHT OF USE AT LEAST ONE SECURED CONTENT ITEM

(75) Inventors: Timo Vataja, Tampere (FI); Virve Inget, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/957,191

(22) Filed: Sep. 30, 2004

(65) Prior Publication Data

US 2006/0069644 A1    Mar. 30, 2006

(51) Int. Cl.
*G06Q 99/00* (2006.01)

(52) U.S. Cl. .......................... 705/51; 713/189; 713/193; 713/164; 380/277; 707/201

(58) Field of Classification Search .................. 705/57, 705/51, 78; 713/161, 200, 89, 189, 193, 713/164; 707/201; 380/277; 726/28
See application file for complete search history.

(56) References Cited

U.S. PATENT DOCUMENTS

| | | | |
|---|---|---|---|
| 6,006,190 A | | 12/1999 | Baena-Arnaiz et al. |
| 6,073,234 A | * | 6/2000 | Kigo et al. .................. 713/161 |
| 2001/0044901 A1 | * | 11/2001 | Grawrock .................... 713/189 |
| 2002/0128975 A1 | * | 9/2002 | Klemba et al. ................ 705/57 |
| 2004/0088333 A1 | * | 5/2004 | Sidman ...................... 707/201 |
| 2005/0005156 A1 | * | 1/2005 | Harper ....................... 713/200 |
| 2005/0060266 A1 | * | 3/2005 | DeMello et al. ............... 705/57 |
| 2007/0014412 A1 | * | 1/2007 | Rollins ....................... 380/277 |

FOREIGN PATENT DOCUMENTS

| | | |
|---|---|---|
| KR | 10-2004-0010435 | 1/2004 |
| WO | WO 9704412 | 2/1997 |
| WO | WO 02/097693 | 12/2002 |

OTHER PUBLICATIONS

Imielinski, Tomasz Badrinath, B R; Mobile wireless computing; Oct. 1994; Communications of the ACM; v37n10 , p. 18-28.*

* cited by examiner

*Primary Examiner*—James P Trammell
*Assistant Examiner*—Behrang Badii
(74) *Attorney, Agent, or Firm*—Alfred A. Fressola; Ware, Fressola, Van Der Sluys & Adolphson, LLP

(57) ABSTRACT

The invention discloses a method, device and computer program product for activating the right of use of at least one secured content item in a device. The method comprises providing a device with at least one unencrypted rights object, wherein the at least one rights object assigns the right of use of at least one secured content item. When the device is powered on for the first time, a device-resident program is executed and the program encrypts at least one rights object with a device-specific encryption key.

14 Claims, 3 Drawing Sheets

METHOD, DEVICE AND COMPUTER PROGRAM PRODUCT FOR ACTIVATING THE RIGHT OF USE AT LEAST ONE SECURED CONTENT ITEM

BACKGROUND OF THE INVENTION

1. Field of the Invention

The invention relates to terminal devices. In particular, the invention relates to a novel and improved method, device and computer program product for activating the right of use of at least one secured content item stored in a memory of the device or a removable memory connectable to the device.

2. Description of the Related Art

Since the introduction of digital storage technologies more effective copyright enforcement has become an issue. Especially, the emergence of the Internet as an illicit distribution channel for copyright protected content has created a strong demand for new technologies in copyright protection. One such technology is the Digital Rights Management (DRM). The DRM is a common term for standards and proprietary systems where a given content item is augmented with information that specifies the user rights associated with it. The content item may, for example, be an audio recording, video, picture, computer program or simply a document. The user rights may comprise various rules pertaining to the use of the content item. For example, a user may be given a time limit during which the content item can be presented, in other words, rendered to the user. The allowed number of listening times, allowed device identities and partial viewing rights are other examples of rules pertaining to the use of a content item. The DRM requires that the presentation device and the presentation software in it are not hostile, that is, they participate in the enforcement of digital rights. In the presentation device there is usually a DRM agent, or in other words, a DRM engine, which enforces the DRM rights and protects the content items from illicit copying. In order to avoid making a DRM protected content item available for copying, the content item may be encrypted while it is in transit from the network to the presentation device and while it is stored in the presentation device outside the DRM engine, for example, on a hard disk.

One standard for the DRM is the one based on the Open Mobile Alliance (OMA) DRM specification. The aim of the OMA DRM is to enable controlled consumption of digital media objects by allowing content providers to express content rights. The media objects are content items such as audio clips, video clips, pictures, Java applications and documents.

If a manufacturer, licensee or operator wants to differentiate their phones, it is hard to do it in open terminals, e.g. in Symbian operating system terminals. Symbian is a software licensing company that develops and supplies an advanced, open, standard operating system for data-enabled mobile phones. For example, if some mobile phone manufacturer wants to make a premium phone including a video editor and a lower-cost mobile phone not including the video editor, there is no means to stop copying the video editor application from the premium mobile phone into the lower-cost mobile phone. The mobile phone manufacturer or an operator may also want to offer applications having restrictions in their usage (e.g. 10 times to use, application valid for 1 month etc.), and after the rights have been consumed, the terminal owner can gain more rights to the application.

The OMA DRM offers restrictions to the use of applications but currently there is no means to offer OMA DRM content that is ready when purchasing the phone. A typical solution at the moment is to purchase and activate content over the air interface.

SUMMARY OF THE INVENTION

The invention offers DRM content in a device that is ready when e.g. purchasing the device.

According to one aspect of the invention there is provided a method for activating the right of use of at least one secured content item in a device, wherein the method comprises providing a device with at least one unencrypted rights object, wherein the at least one rights object assigns the right of use of at least one secured content item, powering on the device for the first time, and executing a device-resident program which encrypts at least one rights object with a device-specific encryption key.

In one embodiment of the invention, at least one content item is stored in a memory of the device.

In one embodiment of the invention, at least one content item is stored in a removable memory connectable to the device, e.g. in a removable memory card.

In one embodiment of the invention, at least one of the at least one rights object is stored in a rights database.

In one embodiment of the invention, the at least one rights object is stored in at least one file.

In one embodiment of the invention, a content item is an application, a picture, an audio file, a document or a video file.

In one embodiment of the invention, the device comprises a mobile terminal.

According to another aspect of the invention there is provided a device, comprising at least one rights object for enabling use of at least one secured content item, a storage module for storing an activation program and a processing unit configured to execute the activation program when the device is booted for the first time, wherein the execution of the activation program comprises: encrypting at least one rights object with a device-specific encryption key.

In one embodiment of the invention, at least one content item is stored in a memory of the device.

In one embodiment of the invention, at least one content item is stored in a removable memory connectable to the device, e.g. in a removable memory card.

In one embodiment of the invention, the device further comprises a rights database configured to store at least one rights object.

In one embodiment of the invention, the device further comprises at least one file configured to store the at least one rights object.

In one embodiment of the invention, a content item is an application, a picture, an audio file, a document or a video file.

In one embodiment of the invention, the device comprises a mobile terminal.

According to another aspect of the invention there is provided a computer program product for activating the right of use of a secured content item in a device, comprising code stored on at least one data-processing device readable medium, the code configured to perform the following step when executed on a data-processing device: executing, when the device is booted for the first time, a device-resident program, which encrypts at least one unencrypted rights object stored in the device with a device-specific encryption key.

The invention discloses a solution where DRM protected content can be activated when purchasing e.g. a mobile terminal rather than afterwards over the air. Furthermore, by using the solution disclosed in the invention a mobile terminal manufacturer or an operator is able to differentiate products.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
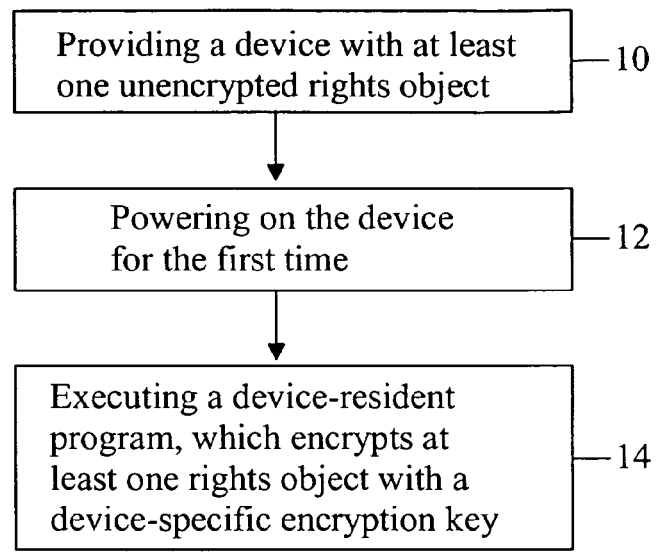
FIG. 1 is a flow diagram illustrating one embodiment of a method according to the invention.

FIG. 1 discloses a flow diagram illustrating one embodiment of a method according to the invention. A device, e.g. a mobile terminal, is provided with at least one unencrypted rights object before the mobile terminal is booted for the first time, step 10. The at least one rights object includes one or more rights files, which give the right to use or display one or more data contents, e.g. applications, audio files, video files, documents etc. with the mobile terminal. An exemplary structure of a rights file is disclosed in FIG. 3.

At step 12, the mobile terminal is booted (switched on) for the first time. The mobile terminal is configured to execute a mobile terminal-resident program, which encrypts at least one rights object with a mobile terminal-specific encryption key in response to booting the mobile terminal for the first time, step 14. By doing this, content items, e.g. applications, in question can only be used in this mobile terminal. The mobile terminal-specific key may be a symmetric or an asymmetric encryption key.

Figure 2A:
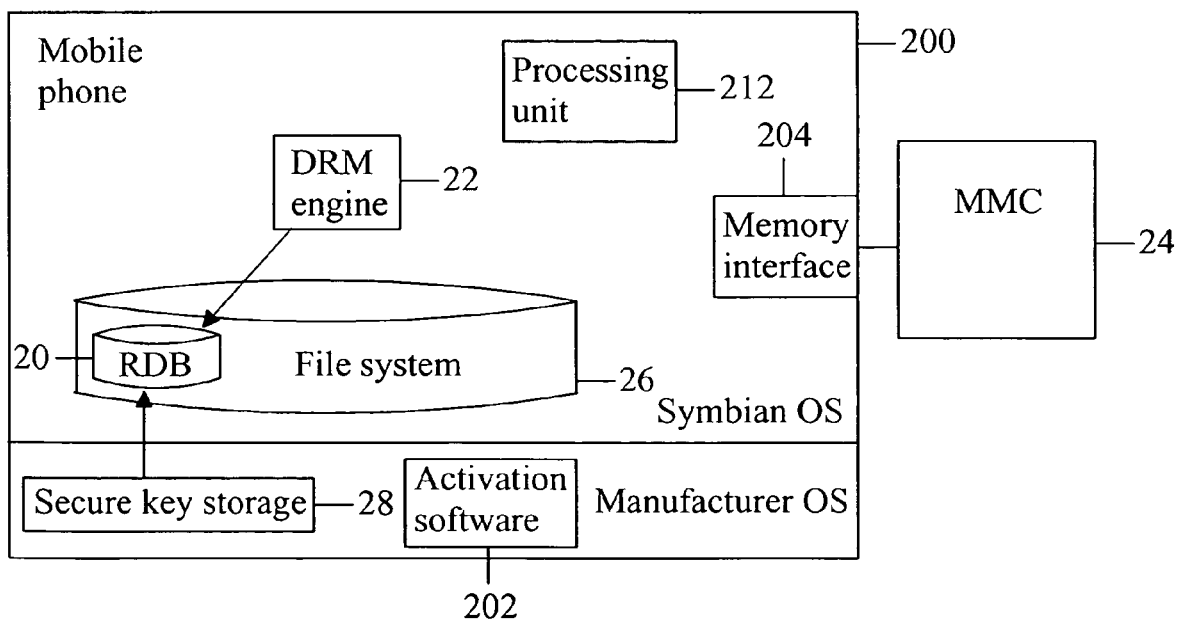
FIGS. 2a-2c are block diagrams illustrating embodiments of a device according to the invention.

FIG. 2a discloses a block diagram illustrating one embodiment of a device according to the invention. A mobile terminal 200 is roughly divided into two parts, a manufacturer operation system and an open part, e.g. a Symbian operation system. The manufacturer operation system includes a secure key storage 28, which comprises a terminal-specific encryption key. Furthermore, in this embodiment the manufacturer operation system also includes an activation software 202. The Symbian operation system part includes a file system 26 that comprises a rights database 20. Rights database 20 comprises one or more rights files that are disclosed in more detail in FIG. 3. In short, each rights file embodies the rights to a piece of content, as well as provides the means to access the content in the manner defined by the rights. A DRM engine 22 is able to access rights database 20 (RDB) in file system 26. Mobile terminal 200 further comprises a processing unit 212, e.g. a processor, configured to execute the activation program, when the device is booted for the first time.

Sometimes vendors/operators want to offer various "extra" applications (e.g. in a Multimedia Card (MMC)) to a customer buying a new mobile terminal, e.g. a mobile phone. For example, an operator might want to give a free trial period for some applications. After the trial, the user can then decide if he wants to use the applications also in the future. Also the operator could sell two different versions of the same phone: a cheap phone and a more expensive phone that has some additional applications ready for use. There needs to be some mechanism for controlling the usage rights of such applications.

In this embodiment, valuable content is protected in order to preserve revenue generating business for content producers (e.g., artists, musicians, authors, etc.) as well as content retailers (e.g., network operators, mISPs, etc.). In accordance with the invention, the operator, mobile Internet Service Provider (mISP), or other entity can provide a sales package that includes the appropriate removable memories, such as a Multimedia Card (MMC) 24.

Each memory card may have a memory card identification (ID) that is unique to each memory card. The memory cards are pre-loaded with content, such as, for example, ringing tones, logos, screen savers, Java, music, games, etc. In accordance with the invention, the content is provided on the memory card 24 in a protected format. For example, in the illustrated embodiment, the content is in a protected format created by Nokia Corporation referred to herein as Secured Content Container (SCC). The SCC as used herein generally refers to a container format that encapsulates encrypted digital content and optionally associated meta-data related to the content. For example, the content may be encrypted with a symmetric key, although in some cases the digital content may not be encrypted. The SCC is logically associated with one or more rights files, such that SCC files can be opened with the correct rights file. A rights file as used herein generally refers to an object that defines the rights that govern the usage of a specific piece of digital content.

When mobile terminal 200 is booted for the first time, activation software 202 activates the encryption of rights database 20 with a mobile terminal-specific encryption key, which is stored in secure key storage 28. The mobile terminal-specific key may be a symmetric or an asymmetric encryption key.

Although the invention is generally described in connection with removable memory cards, such as memory card 24 and a memory interface 204 through which memory card 24 may be connected to mobile terminal 200, the invention is equally applicable where the memory card is manufactured integrally on mobile terminal 200. It is also possible that content can be included in both removable and non-removable memories associated with a mobile terminal. The invention is also equally applicable to embodiments where memory card 24 is either a read/write memory or read-only memory (ROM).

It is obvious that mobile terminal 200 may also include other applications or software components that are not described in more detail and are not disclosed in FIG. 2a.

Although it is disclosed in FIGS. 1 and 2 that the device is a mobile terminal, it is obvious that the device may be any other appropriate device, e.g. a computer or a Personal Digital Assistant (PDA) etc.

FIG. 2a discloses that all rights object are arranged in rights database 20. In another embodiment, the rights objects are separate files outside the rights object database (see FIG. 2b; 206, 208 and 210). All rights objects are separately encrypted with a device-specific encryption key when the device is booted for the first time. In another embodiment, the rights objects may be stored in rights database 20 but only part of database 20 is encrypted, e.g. the rights objects, when the device is booted for the first time. Therefore, e.g. rights database headers may remain unencrypted. Yet in another embodiment also other parts of rights database 20 (in addition to the rights objects) may be encrypted when the device is booted for the first time.

Figure 2B:
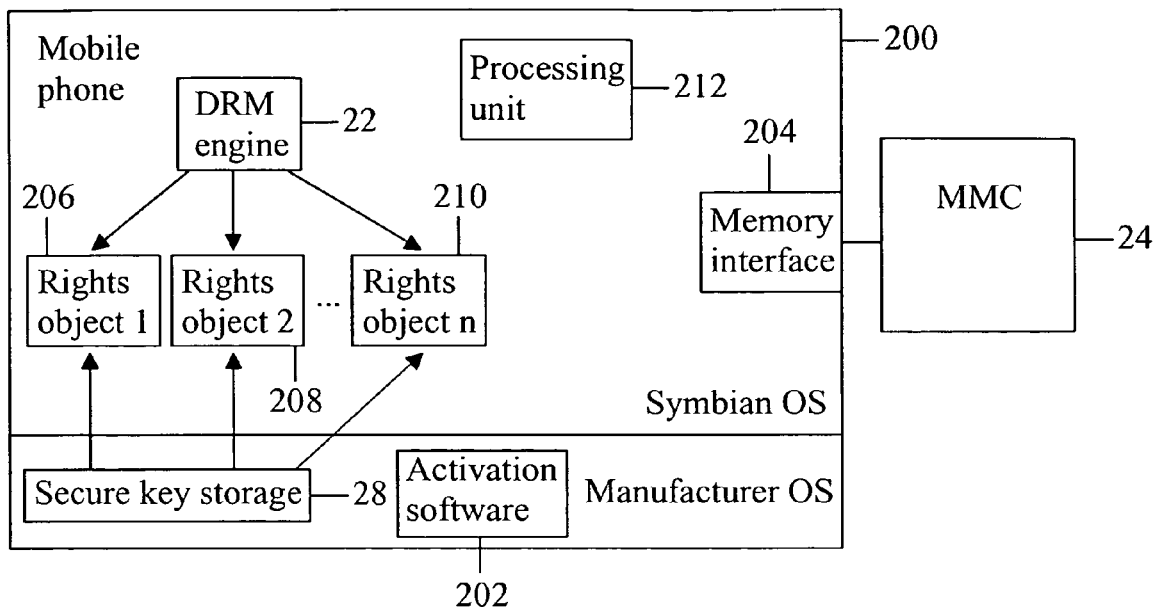
Figure 2C:
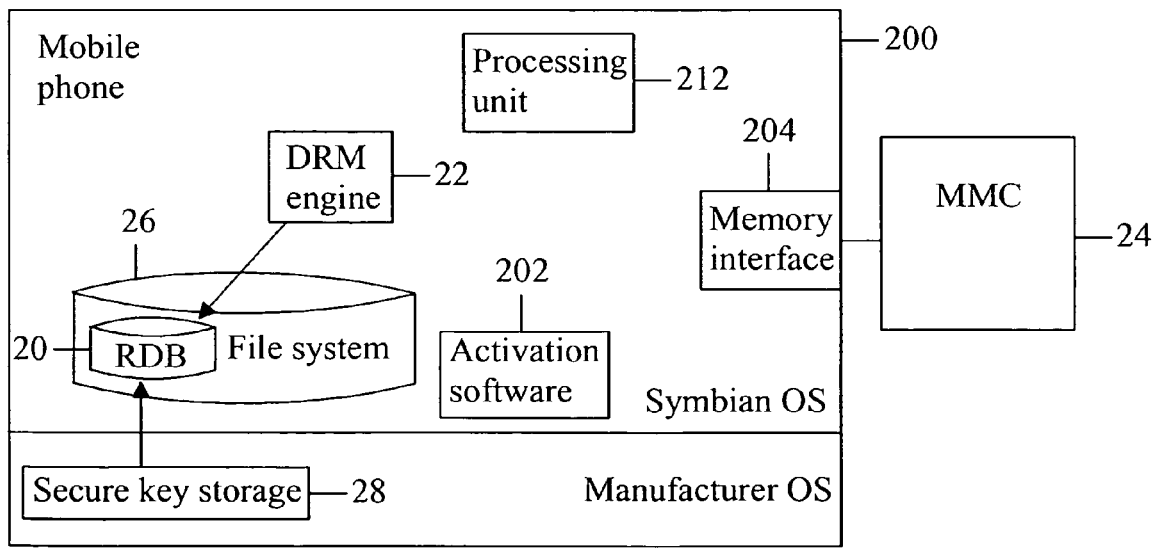

FIGS. 2a and 2b disclose that the manufacturer operation system comprises activation software 202. In another embodiment of the invention, the Symbian operation system or another appropriate operation system part may alternatively comprise activation software 202 (see FIG. 2c). In this case, it must be ensured that activation software 202 cannot be removed or otherwise disabled before the device has been turned on for the first time. Similarly, if activation software 202 is not in the manufacturer operation system part, it must be ensured that activation software 202 cannot be removed or otherwise disabled before it has concluded the encrypting procedure. If activation software 202 is stored e.g. in a read-only-memory (ROM), then the software does not have to reside in the manufacturer operation system part.

It should be noted that although the rights database is in plaintext (and hence can be considered as vulnerable to misuse) during manufacturing phase, the manufacturing facility can be considered as a secure place, and therefore, the possibility for the rights database to leak out in the plaintext form is almost nonexistent.

Figure 3:
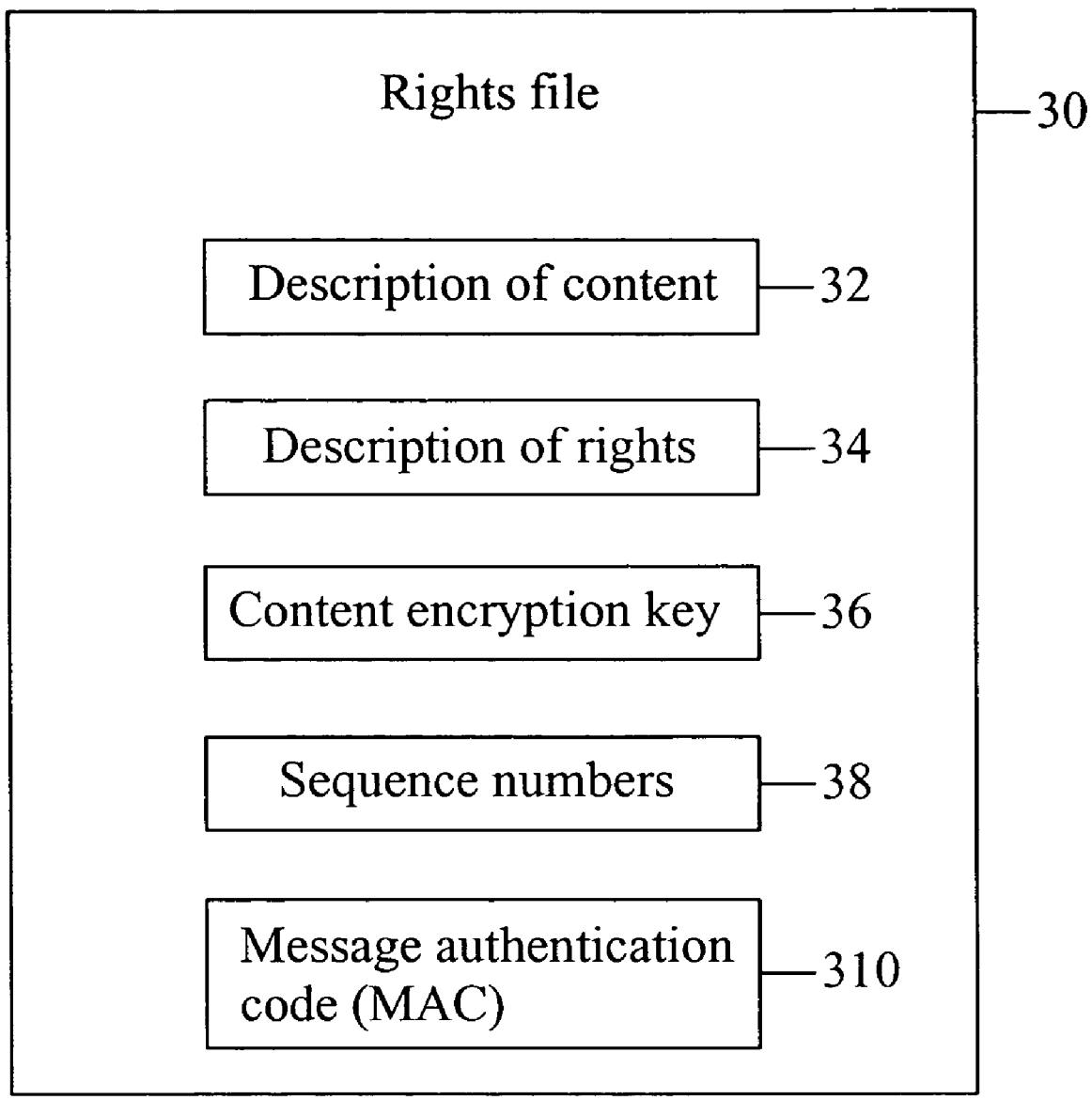
FIG. 3 is a block diagram illustrating one embodiment of a rights file that can be used in the invention.

FIG. 3 illustrates one embodiment of a possible rights file in a rights database that can be used in the invention. It is evident that the particular format or content of a rights file may vary. Therefore, any number of rights file formats in which a user accesses content may be used.

The primary purpose of a rights file is that it embodies the rights to a piece of content, as well as provides the means to access the content in the manner defined by the rights. Referring to the exemplary rights file 30, a description 32 of the content may be provided with the rights file, such as the type of content (e.g., audio, video, text, multimedia, etc.). Each piece of content, or selected pieces of content, will have a corresponding rights file 30, and the description 32 provides a description of its respective content.

For a particular piece of content, there is a description 34 of the rights to that content. These rights may include rights such as transfer rights and usage rights. For example, transfer rights may include the right to (or not to) give or sell the content to another user, or to give or sell a preview or other limited use of the content to another user. Transfer rights may also include rules as to whether the content can be copied to another device owned by the user. Any number of transfer rights may be included. Usage rights are policies specifying how this copy of the content may be used. For example, usage rights may include full access rights to the content, no access rights to the content, preview rights or some other limited usage rights. For example, "preview" usage rights may be provided to users for certain content upon receiving the pre-loaded memory card, to allow the user to have access to the content for a limited time (e.g., one week), a limited quantity of uses (e.g., three times), a limited amount of the content (e.g., thirty seconds of an MP3 song), etc.

The rights file 30 also includes the means to access the content as dictated by the usage rules. In one embodiment, this is provided by a content encryption key 36 that was used to encrypt the content. The rights file may also contain other information, such as sequence numbers 38 to ensure freshness, and a message authentication code (MAC) 310 on all of the other fields, using the content encryption key.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method for encrypting information in a device, wherein the method comprises:

providing a single device with at least one unencrypted rights file, wherein the at least one rights file assigns the right of use of at least one secured content item, said providing occurring prior to powering on the device for the first time;

powering on the device for the first time;

upon powering on the device for the first time, executing a program resident on the device by a processor, such that when executed by the processor the program encrypts said at least one rights file with an encryption key specific to the device; and opening a secured content item among said at least one secured content item in case said opening of said content item is allowed in a rights file among said at least one rights file in the device, said opening of said secured content item being based on information in said rights file, said rights file comprising a precondition rule for presenting the at least one secured content item by executing a presentation software in the device, said precondition rule comprising at least one of a time limit, a number of presentation times and allowed device identities.

2. The method according to claim 1, further comprising: storing at least one content item in a memory of the device.

3. The method according to claim 1, further comprising: storing at least one content item in a removable memory connectable to the device.

4. The method according to claim 1, further comprising: storing at least one of the at least one rights file in a rights database.

5. The method according to claim 1, wherein a content item comprises an application, a picture, an audio file, a document or a video file.

6. The method according to claim 1, wherein the device comprises a mobile terminal.

7. A device, comprising:

at least one unencrypted rights file for enabling use of at least one secured content item, said at least one unencrypted rights file provided to said device prior to powering on the device for the first time;

a storage module for storing an activation program; and a processing unit configured to open a secured content item among said at least one secured content item in case said opening of said content item is allowed in a rights file among said at least one rights file in the device, said opening of said secured content item being based on information in said rights file, said rights file comprising a precondition rule for presenting the at least one secured content item by executing a presentation software in the device, said precondition rule comprising at least one of a time limit, a number of presentation times and allowed device identities, and to execute the activation program when the device is powered on for the first time, wherein the execution of the activation program comprises:

encrypting said at least one rights file with an encryption key specific to the device.

8. The device according to claim 7, further comprising a memory configured to store at least one content item.

9. The device according to claim 7, further comprising a rights database configured to store at least one rights file.

10. The device according to claim 7, further comprising a memory interface configured to receive at least one removable memory in which a content item is stored.

11. The device according to claim 7, wherein a content item comprises an application, a picture, an audio file, a document or a video file.

12. The device according to claim 7, wherein the device comprises a mobile terminal.

13. A readable medium stored with code for realizing the following when executed on a data-processing device: executing, when the device is powered on for the first time, a program resident on the device by the data-processing device, such that when executed by the data-processing device the program encrypts at least one unencrypted rights file provided to the device prior to powering on the device for the first time, with an encryption key specific to the device, the unencrypted rights file for enabling use of at least one secured content item; and opening a secured content item, among said at least one secured content item, in case said opening of said content item is allowed in a rights file among said at least one rights file in the device, said opening of said secured content item being based on information in said rights file, said rights file comprising a precondition rule for presenting the at least one secured content item by executing a presentation software in the device, said precondition rule comprising at least one of a time limit, a number of presentation times and allowed device identities.

14. A device, comprising:

means for providing at least one unencrypted rights file for enabling use of at least one secured content item, said at least one unencrypted rights file provided to said device prior to powering on the device for the first time;

means for storing an activation program;

means for opening a secured content item among said at least one secured content item in case said opening of said content item is allowed in a rights file among said at least one rights file in the device, said opening of said secured content item being based on information in said rights file, said rights file comprising a precondition rule for presenting the at least one secured content item by executing a presentation software in the device, said precondition rule comprising at least one of a time limit, a number of presentation times and allowed device identities, and for executing the activation program when the device is powered on for the first time, wherein the execution of the activation program comprises:

encrypting said at least one rights file with an encryption key specific to the device.

\* \* \* \* \*